(12) United States Patent
Caine

(10) Patent No.: US 9,660,574 B2
(45) Date of Patent: May 23, 2017

(54) SYSTEM AND METHOD FOR ADJUSTING NOTIFICATIONS FOR SOLAR MONITORING SYSTEMS

(71) Applicant: Also Energy, Inc., Boulder, CO (US)

(72) Inventor: Holden R. Caine, Boulder, CO (US)

(73) Assignee: Also Energy, Inc., Boulder, CO (US)

( * ) Notice: Subject to any disclaimer, the term of this patent is extended or adjusted under 35 U.S.C. 154(b) by 0 days.

(21) Appl. No.: 14/957,374

(22) Filed: Dec. 2, 2015

(65) Prior Publication Data

US 2016/0155318 A1    Jun. 2, 2016

Related U.S. Application Data

(60) Provisional application No. 62/086,620, filed on Dec. 2, 2014.

(51) Int. Cl.
*H02S 50/00* (2014.01)
*G08B 13/19* (2006.01)
*G08B 13/14* (2006.01)
*G08B 21/18* (2006.01)

(52) U.S. Cl.
CPC .......... *H02S 50/00* (2013.01); *G08B 13/1409* (2013.01); *G08B 13/19* (2013.01); *G08B 21/185* (2013.01)

(58) Field of Classification Search
None
See application file for complete search history.

(56) References Cited

U.S. PATENT DOCUMENTS

2012/0084027 A1*   4/2012   Caine ..................... H02S 50/10
                                                     702/58
2015/0123798 A1*   5/2015   Boross ................. G08B 21/182
                                                     340/540

* cited by examiner

*Primary Examiner* — Leon-Viet Nguyen
(74) *Attorney, Agent, or Firm* — Sheridan Ross P.C.

(57) ABSTRACT

The invention includes a system and method for characterizing and monitoring photovoltaic power systems, and more particularly, to solar monitoring systems that provide notification of fault and performance conditions. Mistaken fault conditions causing false alarms are corrected by use of current weather conditions and performance data to adjust fault detection algorithms and control features.

8 Claims, 2 Drawing Sheets

SYSTEM AND METHOD FOR ADJUSTING NOTIFICATIONS FOR SOLAR MONITORING SYSTEMS

CROSS-REFERENCE TO RELATED APPLICATION

This application claims priority under 35 U.S.C. §119(e) to U.S. Provisional Patent Application Ser. No. 62/086,620 filed Dec. 2, 2014, which is incorporated herein in its entirety by reference.

FIELD OF THE INVENTION

The invention relates to a system and method for characterizing and monitoring photovoltaic power systems, and more particularly, to solar monitoring systems that provide notification of fault and performance conditions, wherein mistaken fault conditions causing false alarms are corrected by use of current weather conditions and performance data to adjust fault detection algorithms and control features.

SUMMARY OF THE INVENTION

In a Photovoltaic (PV) or solar array system, solar panels may be organized into an array of strings, where each string contains a series of individual solar panels. These strings are then connected together in parallel to produce a desired voltage and current necessary for efficient DC to AC conversion. Monitoring systems can be used to notify PV system operators of a wide variety of fault and performance conditions, such as differences in power produced between nearby strings. In many cases, reportable conditions are mistakenly identified due to inclement weather conditions and the resulting impact from snow and dirt accumulation that may persist for some period of time after the event that caused the initial disturbance.

The solution described here utilizes current weather conditions, in conjunction with system performance data, to reduce or eliminate false alarms by adjusting the sensitivity of fault detection algorithms and control used to generate alert or alarm notifications.

In accordance with one preferred embodiment of the invention, it can be considered a system for adjusting notifications for solar monitoring systems, comprising: a photovoltaic string for converting sunlight into electrical energy; a combiner for combining the output signals of a plurality of photovoltaic strings; an inverter for converting the DC output signals of a plurality of combiners into AC power; a sensor for detecting data associated with a plurality of photovoltaic strings; a monitoring system for monitoring the performance of a photovoltaic array, including: (i) a memory; (ii) a processor in connection with the memory, the processor operable to execute commands associated with a fault detection function and fault notification control, said fault detection function including at least one fault detection algorithm; (iii) at least one sensor for measuring at least one of many ambient conditions, including at least one of irradiance, temperature, wind speed, wind direction, humidity, rain, and snow; (iv) a PV system model module operable to provide notifications to a user regarding alarm or fault notifications; and (v) a fault modifying function communicating with the processor to modify the fault detection function and fault notification control, said fault modifying function including correction data associated with at least one of weather service data, weather condition data, and deduced ground condition data; and wherein commands associated with the fault detection and fault notification control are modified taking into account the correction data to provide more accurate reporting status for the solar monitoring system; and a web application operable to receive user-selectable commands to display associated data concerning corrected fault notifications or disabled fault notifications.

Further according to the first preferred embodiment, the invention may include: (a) an electronic adjusted notification generated from said corrected fault notifications or disabled fault notifications, said notification comprising at least one of an email message, an SMS message, a prerecorded telephone message, or a visual or audio indication provided on a computer of a user that electronically communicates with the web application; (b) at least one logic consideration associated with said fault modifying function to improve detection of a transition between two ground condition states, said at least one logic consideration including at least one of; a threshold power production variable, a performance ratio, a performance index, or a predetermined time span/time lapse variable; and (c) said two ground condition states may include a partial snow-covered state and a clear state.

According to another preferred embodiment of the invention, it can be considered a method for adjusting notifications generated by solar monitoring systems, comprising: providing at least one sensor for detecting data associated with a plurality of photovoltaic strings used to generate electrical power; providing a monitoring system for monitoring the performance of a photovoltaic array, including: (i) a memory; (ii) a processor in connection with the memory, the processor operable to execute commands associated with a fault detection function and fault notification control, said fault detection function including at least one fault detection algorithm; (iii) at least one sensor for measuring at least one of many ambient conditions, including at least one of irradiance, temperature, wind speed, wind direction, humidity, rain, and snow; (iv) a PV system model module operable to provide notifications to a user regarding alarm or fault notifications; and (v) a fault modifying function communicating with the processor to modify the fault detection function and fault notification control, said fault modifying function including correction data associated with at least one of weather service data, weather condition data, and deduced ground condition data, wherein commands associated with the fault detection and fault notification control are modified taking into account the correction data to provide more accurate reporting status for the solar monitoring system; receiving data associated with a fault detected by the at least one sensor; analyze the data to determine whether the data will trigger an alert or alarm conditions; further analyze the data with the fault modifying function and corresponding correction data to determine whether the alert or alarm condition should be triggered; modifying or disabling an alert or alarm condition signal taking into account the fault modifying function and corresponding correction data; and generating an adjusted notification in response to the modifying step.

Further according to the method of this second embodiment, the invention may include: (a) an electronic adjusted notification generated from said corrected fault notifications or disabled fault notifications, said notification comprising at least one of an email message, an SMS message, a prerecorded telephone message, or a visual or audio indication provided on a computer of a user that electronically communicates with the web application; (b) at least one logic consideration associated with said fault modifying function to improve detection of a transition between two ground condition states, said at least one logic consideration including at least one of; a threshold power production variable, a performance ratio, a performance index, or a predetermined time span/time lapse variable; and (c) said two ground condition states may include a partial snow-covered state and a clear state.

DETAILED DESCRIPTION

Figure 1:
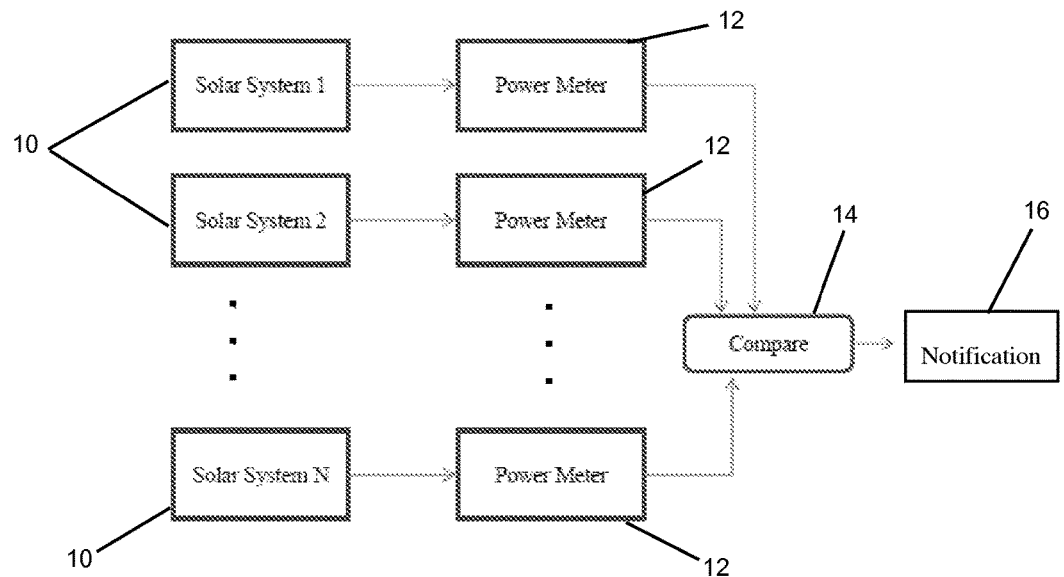
FIG. 1 is a schematic block diagram of an array of solar systems with meters used to detect system failures.

Referring to FIG. 1, multiple parallel systems or components may be compared to one another to determine if any of them are under-performing. More specifically as shown, a plurality of N number of PV or solar array systems 10 may be provided, and each system 10 has power output measured by a corresponding power meter 12. A comparator function 14 is enabled to allow comparison of output power as between each of the systems 10 to determine which, if any, of the separate systems may be under performing according to expected standards. In this regard, the comparator function 14 may include use of various algorithm(s) which take into account measured power to determine if any of the systems are under-performing or are otherwise not functioning to expected standards. Accordingly, the comparator function 14 may make use of one or more data processors which run the various algorithm(s). The data processors may be more specifically provided in the form of a general purpose personal computer(s) (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These computers may also have any of a variety of applications, including for example, database client and/or server applications, and web browser applications. Alternatively, the computers may be any other electronic device, such as a thin-client computer, internet-enabled mobile telephone, and/or personal digital assistant, capable of communicating via a communication network and/or displaying and navigating web pages or other types of electronic documents.

A comparison is made between power outputs for each of the respective systems 10, and as dictated by out of limit or fault conditions, a notification 16 can be generated. The notification can take many forms including an electronic notification to include an email, a text message, a telephone call with a prerecorded message, among others. The notification may include a brief description of the out of limit or fault condition that has been measured and analyzed between the respective systems.

Snow covering a solar panel array usually interrupts some or all power production. When the snow begins to melt, normal operations resume at different times because the snow typically melts at different rates at various locations on the array. Without additional information, the comparison algorithm used will generate notification messages to the operator when the systems are not performing similarly, since the differences resulting from snow on the PV panels results in measured power differences that are interpreted by fault system logic as simply component failures in the array. According to the invention, fault system logic can be substantially improved by taking into consideration current weather conditions and performance data to adjust fault detection algorithms and control features which otherwise would generate incorrect alert and alarm notifications.

Figure 2:
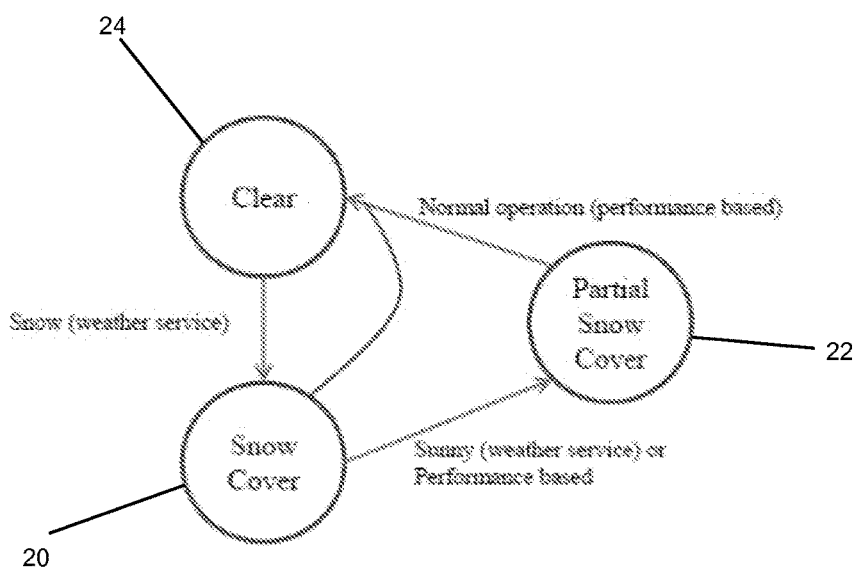
FIG. 2 is a schematic block diagram illustrating deduced ground conditions from weather service data, and how these ground conditions may be interpreted for use as inputs to modify alert or alarm notifications, for example, by disabling the transmission of notifications.

Referring to FIG. 2, conditions on the ground and on the solar panels may be deduced or determined by first using snow condition data from a weather data service. When a snow condition 20 is indicated by the weather service data, a variable or parameter within a comparison algorithm(s) may be marked or "flagged" as a corresponding snow-covered condition. When the snowfall event ends, the ground condition will remain in the snow-covered condition for a period of time, and will transition over time to a partial snow covered-condition 22. The flagged variable or parameter within the comparison algorithm(s) may therefore be modified to indicate a partial snow-covered state, depending on weather conditions or system performance. The partial snow-covered state may further provide helpful information to the operator, and may also be used to control alert notifications that may be appropriate under those conditions. The ground conditions are assumed to be clear when the system resumes normal operation and at this point when a clear condition 24 is confirmed, the fault detection algorithm(s) may be reset or otherwise cleared from a flagged variable or parameter.

The determination of ground conditions, i.e., whether there is a snow covered state, partial snow covered state or clear state, may be the subject of an independent variable or algorithm in which weather service data is used in combination with other data/factors such as temperature, sunlight conditions, and daylight associated with the time of year. Further, recorded historical observations may also be used to deduce ground conditions in which each solar array of a monitored system may have historical data associated therewith as to snow cover conditions based on prior similar snow events. This historical data may therefore be used to supplement the variable or algorithm used to deduce the current ground conditions.

Additional logic may be added to improve detection of transitions between different snow covered conditions. For example, to improve the detection of the transition from a partial snow-covered state to a clear state, additional considerations can be incorporated within the algorithm(s) utilized to determine these states. Improved detection of this change in state may further reduce the number of false alarms/notifications when snow melt occurs, since there can be a premature detection of a clear state (normal operation) when there may still be some appreciable snow cover. One additional logic consideration includes a threshold power production value or variable. This value or variable can be expressed as power production that exceeds a user defined percentage of expected power output. Expected power output can be calculated from measured irradiance and temperature. For example, the user defined percentage could be set at a predetermined value or range, and if the power production exceeds this user defined percentage, then the notification control function 38 could indicate that the clear state existed, i.e., no material amount of remaining snow cover. Another logic consideration that may be used includes a performance ratio. This ratio can be expressed as the ratio of power production to irradiance or the ratio of energy to insolation. More specifically, a performance ratio can be expressed as the ratio of electrical power (kW) to solar power (kW/m^2). It can also be calculated as an average over time, in which case the energy units would be kWh and kWh/m^2. Irradiance refers to power—that is, the amount of measured sunlight, and insolation refers to energy—that is, the amount of solar radiation reaching a given area. Yet another logic consideration that may be used includes a performance index that can be expressed as a ratio between actual power output to expected power output. Yet another logic consideration that may be adopted includes a predetermined time span or time lapse variable. This variable could be determined, for example, by first determining the value of any one of the previously mentioned logic considerations, and then associating with these considerations with an average amount of time elapsed between the partial snow-covered state and clear state. Therefore, this last logic consideration considers both measured values as well as an average amount of time that must lapse prior to generating a conclusion that a system is in a clear state. It should be appreciated that these logic considerations provide greater ability to accurately predict or deduce ground conditions to thereby reduce or limit the frequency of false alarms.

Figure 3:
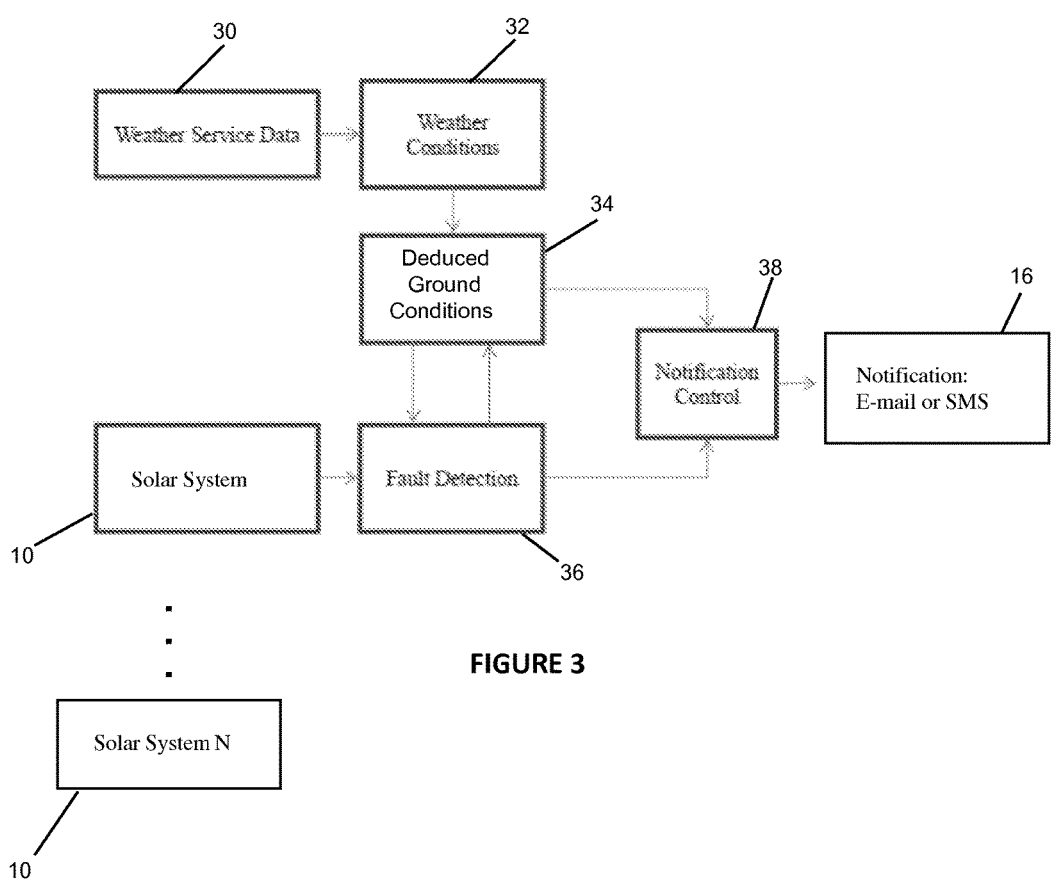
FIG. 3 is another schematic block diagram illustrating a method of the invention in which weather service data, observed weather conditions, and observed/deduced ground conditions may be evaluated to disable or modify a fault detection function, such as a fault detection algorithm, to thereby modify subsequent alert or alarm notifications; alternatively, the method may include use of a direct interface with a notification control function to thereby modify alert or alarm notifications.

Referring to FIG. 3, this figure summarizes a method by which fault detection may be modified to account for specific weather and/or deduced ground conditions. Weather service data 30 is retrieved, and the data includes data/information regarding weather conditions 32. As mentioned, use of the weather conditions 32 are used to deduce ground conditions 34. The deduced ground conditions are considered within the fault detection logic 36, which may include one or more algorithms. A notification control function 38 is then triggered based upon fault detection logic 36, and a notification 16 is then generated, such as an email or SMS message. Alternatively, as shown, ground condition data/information may be directly input to the notification control function 38, such as a manual intervention by an operator, as mentioned.

Normally, detection of faults results in an immediate notification. Using the ground condition information 34, erroneous notifications can be prevented or lessened in frequency by disabling the transmission of those messages to a system operator. The system may still indicate fault conditions for diagnostic purposes, or the fault condition can be completely disabled when full or partial snow cover exists on the ground or solar panels.

In lieu of changes being made to the algorithm(s) themselves by introducing a flagged condition to a variable or parameter within the algorithm(s), the snow condition data may be used as a post or subsequent modifying step or calculation after the algorithm logic has been normally processed.

Other means can be employed to ascertain the presence of snow on solar panels of a particular solar panel array, including the use of data from nearby solar panel sites, or by manual intervention by the operator in which the operator may have visual data, such as remote cameras stationed at the affected solar panel arrays. Regardless of the way in which the data is captured, the invention contemplates various ways in which the data can be used to alter normal notifications that would be generated; introduction of algorithm-based modifications, subsequent calculations or modifications to the processed algorithm(s), or manual intervention by an operator in which the operator is able to discern the extent to which weather-based events are affecting power production and then entering appropriate data or information that accounts for the weather based anomaly.

Although the invention is described particularly with respect to use of weather service data, is also contemplated that a PV system may utilize one or more of the following data streams to assess the expected performance of the PV system at any given point in time: local irradiance, ambient and module temperatures, irradiance estimates from satellite imagery, video feeds, and nearby PV system data. To the extent these additional data streams are utilized within a logic function of the invention to determine power output, these data streams may also be "tagged" or otherwise annotated to further improve comparison and notification functions. For example, use of weather data could be complemented with satellite imagery in which confirmation to be obtained as to the extent of snow cover over a designated PV system is a function of both the weather data and satellite imagery: weather data could confirm for example a significant snow event, and satellite imagery could confirm the extent of snow cover over the evaluated PV system. These combined data streams can therefore provide additional reliability or consistency as to notifications generated from pre-designated alert notifications.

There are numerous advantages to the present invention. Existing weather service data can be used to improve fault detection and notification to reduce or eliminate erroneous transmission of information to system operators. Obtaining existing weather service data does not substantially increase the cost or complexity of the system, yet provides an economical solution to inherit shortcomings in power monitoring of PV systems. An additional benefit of the invention is the ability to categorize lost production based on snow cover. It may be useful to know, for example, how much production is lost during times of snow cover versus how much production is lost due to component failures.

Although the invention has been described with respect to particular preferred embodiments, it shall be understood that the invention is intended to also cover the scope of the claims appended hereto.

What is claimed is:
1. A system for adjusting notifications for solar monitoring systems, comprising:
   a photovoltaic string for converting sunlight into electrical energy;
   a combiner for combining the output signals of a plurality of photovoltaic strings;
   an inverter for converting the DC output signals of a plurality of combiners into AC power;
   a sensor for detecting data associated with a plurality of photovoltaic strings;
   a monitoring system for monitoring the performance of a photovoltaic array, including:
      (i) a memory;
      (ii) a processor in connection with the memory, the processor operable to execute commands associated with a fault detection function and fault notification control, said fault detection function including at least one fault detection algorithm;

(iii) at least one sensor for measuring at least one of many ambient conditions, including at least one of irradiance, temperature, wind speed, wind direction, humidity, rain, and snow;

(iv) a PV system model module operable to provide notifications to a user regarding alarm or fault notifications; and (v) a fault modifying function communicating with the processor to modify the fault detection function and fault notification control, said fault modifying function including correction data associated with at least one of weather service data and deduced ground conditions, wherein commands associated with the fault detection and fault notification control are modified taking into account the correction data to provide a more accurate reporting status for the solar monitoring system; and a web application operable to receive user-selectable commands and to display associated data concerning corrected fault notifications or disabled fault notifications.

2. A system, as claimed in claim 1, further including:

an electronic adjusted notification automatically generated from said corrected fault notifications or disabled fault notifications, said notification comprising at least one of an email message, an SMS message, a prerecorded telephone message, or a visual or audio indication provided on a computer of a user that electronically communicates with the web application.

3. A system, as claimed in claim 1, further including:

at least one logic consideration associated with said fault modifying function to improve detection of a transition between two ground condition states, said at least one logic consideration including at least one of: a threshold power production variable, a performance ratio, a performance index, and a predetermined time span/time lapse variable.

4. A system, as claimed in claim 3, wherein:

said two ground condition states include a partial snow-covered state and a clear state.

5. A method for adjusting notifications generated by solar monitoring systems, comprising:

providing at least one sensor for detecting data associated with a plurality of photovoltaic strings used to generate electrical power;

providing a monitoring system for monitoring the performance of a photovoltaic array, including:

(i) a memory;

(ii) a processor in connection with the memory, the processor operable to execute commands associated with a fault detection function and fault notification control, said fault detection function including at least one fault detection algorithm;

(iii) at least one sensor for measuring at least one of many ambient conditions, including at least one of irradiance, temperature, wind speed, wind direction, humidity, rain, and snow;

(iv) a PV system model module operable to provide notifications to a user regarding alarm or fault notifications; and (v) a fault modifying function communicating with the processor to modify the fault detection function and fault notification control, said fault modifying function including correction data associated with at least one of weather service data and deduced ground conditions, wherein commands associated with the fault detection and fault notification control are modified taking into account the correction data to provide more accurate reporting status for the solar monitoring system;

receiving data associated with a fault detected by the at least one sensor for detecting data associated with a plurality of photovoltaic strings;

analyzing the data to determine whether the data will trigger an alert or alarm conditions;

further analyzing the data with the fault modifying function and corresponding correction data to determine whether the alert or alarm condition should be triggered;

modifying or disabling an alert or alarm condition signal taking into account the fault modifying function and corresponding correction data; and automatically generating an adjusted notification in response to the modifying step.

6. A method, as claimed in claim 5, wherein:

said adjusted notification comprises at least one of an email message, an SMS message, a prerecorded telephone message, or a visual or audio indication provided on a computer of a user that electronically communicates with the monitoring system.

7. A method, as claimed in claim 5, further including:

at least one logic consideration associated with said fault modifying function to improve detection of a transition between two ground condition states, said at least one logic consideration including at least one of: a threshold power production variable, a performance ratio, a performance index, and a predetermined time span/time lapse variable.

8. A method, as claimed in claim 7, wherein:

said two ground condition states include a partial snow-covered state and a clear state.

* * * * *